Sept. 22, 1942.  C. L. CHARBONNEAU  2,296,465
LOCOMOTIVE
Filed Nov. 22, 1940
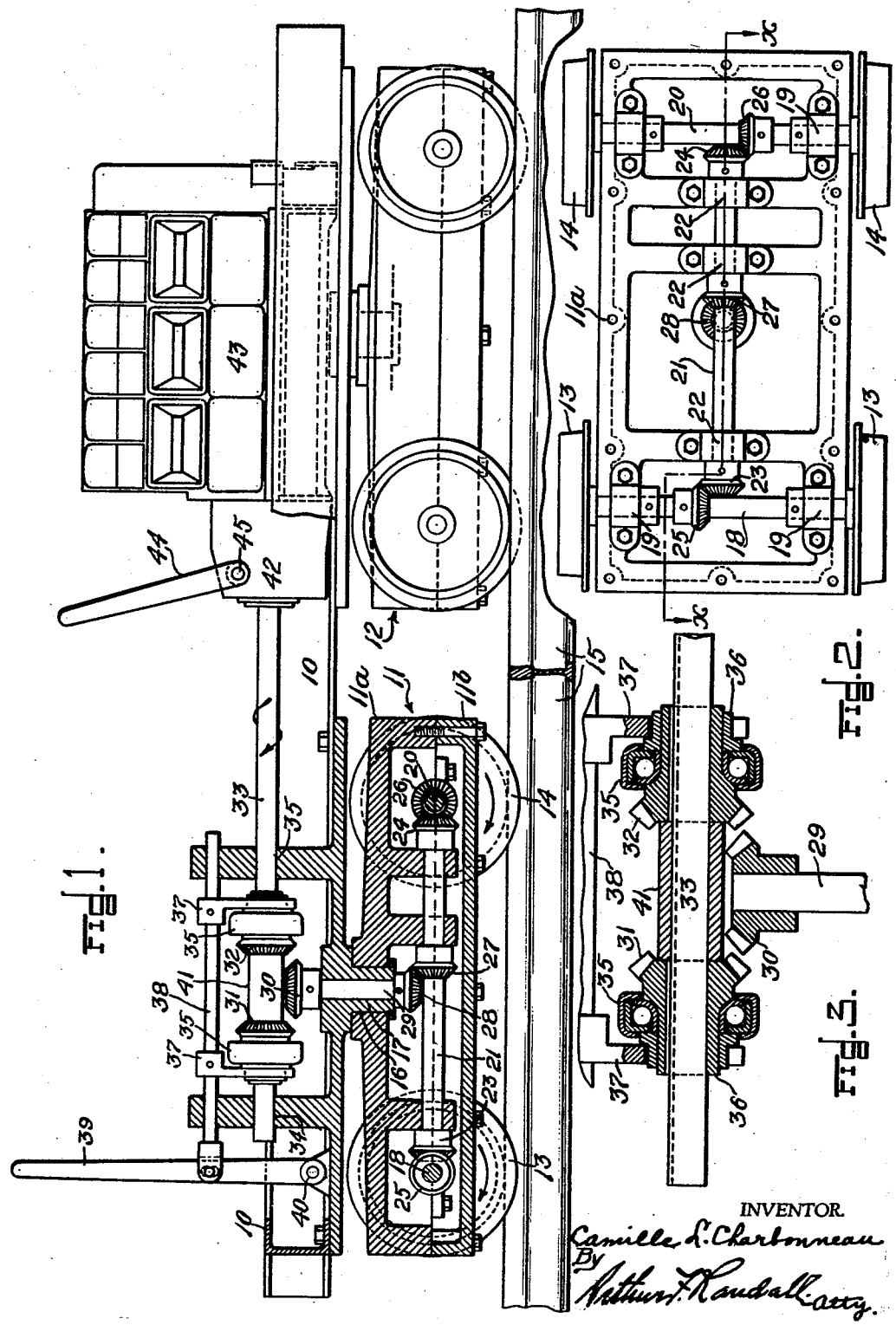
INVENTOR.
Camille L. Charbonneau
By
Arthur F. Randall atty.

Patented Sept. 22, 1942

2,296,465

UNITED STATES PATENT OFFICE 2,296,465

LOCOMOTIVE

Camille L. Charbonneau, Fairhaven, Mass.

Application November 22, 1940, Serial No. 366,661

1 Claim. (Cl. 105—117)

This invention relates to locomotives of that class which comprises a chassis including a frame supported by two or more wheel-equipped trucks and having an internal combustion engine mounted thereon that is connected with wheels of the vehicle to propel the latter.

The object of the invention is to provide a locomotive of the class referred to which will be of simple, inexpensive and efficient construction. To this end I have provided a locomotive of the class indicated which, in its preferred form, may be constructed and operate as set forth in the following description, the several features of the invention being separately pointed out and defined in the claim at the close of the description.

In the accompanying drawing:

Figure 1 is a side elevation, partly in section, of a locomotive constructed in accordance with this invention.

Figure 2 is a bottom plan view of one of the trucks of the locomotive with the bottom section or wall of its body removed.

Figure 3 is a detail of the power-transmitting mechanism.

The chassis of the illustrated embodiment of this invention comprises a frame 10 seated upon two trucks 11 and 12, one near each end thereof, each of said trucks being provided with two pairs of wheels 13 and 14 adapted to travel on rails 15.

Each truck comprises a body 11 consisting of an upper inverted box-like section 11a whose top wall is made at its middle with a vertical bearing or socket 16 within which is swivelly mounted a tubular trunnion 17 projecting downwardly from, and forming a rigid part of, the frame 10.

The wheels 13 of each truck are fast on the opposite end of a transverse axle 18 journaled in bearings 19 provided upon body section 11a at opposite sides thereof. The wheels 14 of each truck are likewise fixed upon the opposite ends of a transverse axle 20 journaled in bearings provided upon body section 11a at opposite sides thereof.

Between the two axles 18 and 20 of truck 11, and in the same horizontal plane therewith, is a longitudinally disposed shaft 21 journaled in bearings 22 provided upon the body section 11a of the truck, and at its opposite ends this shaft is provided with bevel gears 23 and 24 in mesh, respectively, with bevel gears 25 and 26 fast on axles 18 and 20.

Near its middle the shaft 21 also has fixed on it a bevel gear 27 in mesh with a bevel gear 28 fast on the lower end of a vertical shaft 29 rotatably mounted within the tubular trunnion 17 through which it extends upwardly to the top thereof where it has fixed on it a gear 30.

This gear 30 is co-operatively associated with two opposed bevel gears 31 and 32 disposed at opposite sides thereof and slidably splined on a horizontal longitudinally disposed driving shaft 33 which is in the same vertical plane with the shaft 29. Shaft 33 is journaled in bearings 34 and 35 provided on frame 10 of the chassis.

Each gear 31 and 32 is made with an elongate hub on which is mounted a ball thrust bearing 35 disposed between a shoulder on the gear and a flanged abutment collar 36 slidably mounted on the hub of said gear. Each abutment collar 36 is embraced by a yoke or forked arm 37 fast on a bar 38 slidably mounted in bearings on chassis frame 10 and one end of this slide bar is pivotally connected to a hand lever 39 fulcrumed at 40 on chassis frame 10.

The gears 31 and 32 are disposed at opposite sides of the gear 30 and maintained in spaced apart relationship by a sleeve 41 slidably mounted on shaft 33 between said two gears, the distance between the latter being greater than the diameter of gear 30.

It will be clear that slide bar 38 with its arms 37 provides a shipper member by means of which the operator may adjust the two gears 31 and 32 on shaft 33 so as to move either of said two gears into mesh with gear 30 and the other out of mesh, or both gears may be adjusted into idle intermediate positions where they are both out of mesh with gear 30.

One end of the driving shaft 33 is connected through the usual clutch mechanism disposed within a housing 42 with one end of the crank shaft of a Diesel engine 43 mounted on frame 10. This clutch mechanism includes a hand lever 44 fast on the control shaft 45 of said mechanism by means of which the operator sets and unsets the latter.

When the clutch is set and shaft 33 is being driven by the engine in the direction of the arrow, Fig. 1, while gear 32 is in mesh with gear 30, the shaft 29 is driven in one direction and acts through the connections described to drive the wheels 13 and 14 in the directions indicated by the arrows in Fig. 1. Also, rotation of shaft 33 while gear 31 is in mesh with gear 30 will cause shaft 29 and wheels 13 and 14 to be driven in the opposite directions. Thus, through the medium of the control lever 39 the operator may start, stop and reverse the movement of the vehicle.

Since the axis of shaft 29 is coincident with the axis of the pivotal connection between the frame 10 and truck 11 it will be clear that said truck is at all times free to swing laterally relatively to frame 10 and on the axis of trunnion 17, while negotiating curves.

The body of truck 11 also comprises an inverted box-like bottom section 11b fastened by screws to the upper body section 11a. The two box-like sections of the truck body are fitted together at their chimes so that they provide a gear box completely inclosing the pairs of gears 23—25, 24—26 and 27—28, as well as shaft 21. This gear box is also adapted to serve as a reservoir for holding a lubricant.

What I claim is:

A locomotive comprising a box-like truck body whose interior provides a closed compartment adapted to hold a lubricant; a pair of body-supporting axles journaled on said body and extending transversely through said compartment, one near each end thereof; traction wheels fast on said axles alongside of said body; a chassis seated directly upon and supported by the top wall of said truck body; means swivelly connecting said chassis and truck body so that they are pivotally movable relatively on a vertical axis disposed between said axles, said means including a tubular pivot trunnion projecting downwardly from and forming a rigid part of said chassis, said trunnion being journaled in a bearing provided in the top wall of said body; a motor mounted on said chassis; and power-transmitting mechanism connecting said motor with both of said axles, said mechanism including a single vertical shaft journaled within said tubular trunnion, a horizontal motor-driven shaft journaled on said chassis, reversible gear mechanism for connecting the upper end of said vertical shaft with said horizontal shaft, a single horizontal shaft element disposed longitudinally wholly within said compartment and journaled in bearings on said truck body, a pair of intermeshing gears connecting the intermediate portion of said shaft element with the lower end of said vertical shaft, a pair of intermeshing gears connecting one end of said shaft element with one of said axles, and a pair of intermeshing gears connecting the opposite end of said shaft element with the other axle, said three pairs of intermeshing gears being also disposed within said compartment.

CAMILLE L. CHARBONNEAU.